Dec. 31, 1940.    F. F. GILMORE ET AL    2,226,608
METHOD OF REPRODUCING FORM TOOLS
Filed Jan. 12, 1939
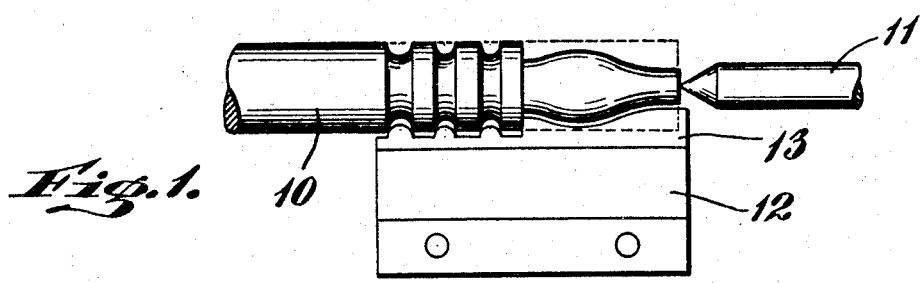
Fig.1.
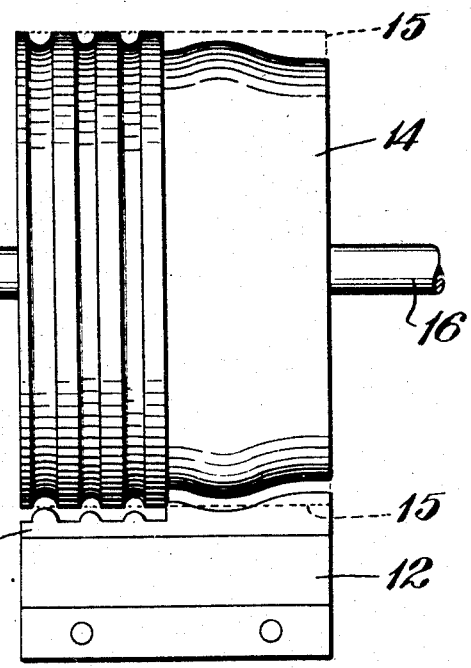
Fig.2.
Fig.3.
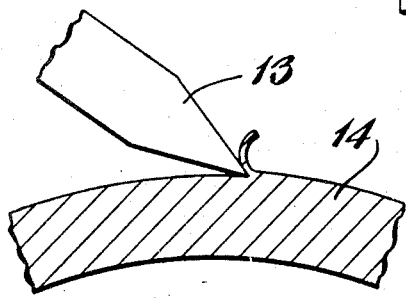
Fig.5.
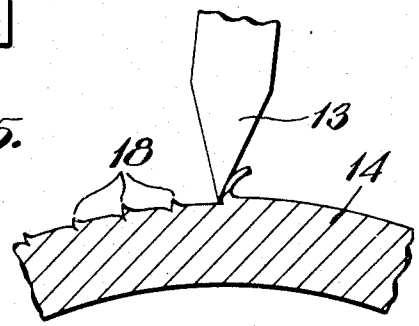
Fig.6.
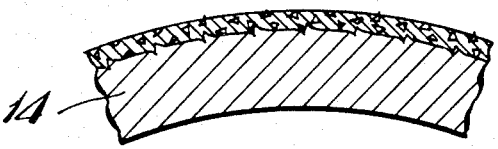
Fig.4.
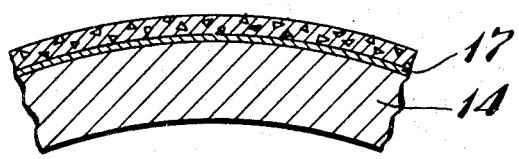
INVENTORS
Folliard F. Gilmore
Frank H. Kotler
BY
Kenyon & Kenyon
ATTORNEYS.

Patented Dec. 31, 1940

2,226,608

UNITED STATES PATENT OFFICE 2,226,608

METHOD OF REPRODUCING FORM TOOLS

Folliard F. Gilmore, Wellesley Hills, and Frank W. Kotler, Watertown, Mass.; said Kotler assignor to said Gilmore Application January 12, 1939, Serial No. 250,525

6 Claims. (Cl. 51—293)

This invention relates to a method of making a diamond-charged abrasive surface, and to the grinding or cutting tool which possesses such a surface.

This application is a continuation in part of our co-pending application, S. N. 212,306, filed June 7, 1938, for "Abrasive surfaces and method of preparing the same."

In the machining of circular forms of complex contours, a familiar tool used for production purposes is the circular form-tool. Such form-tools often have a cutting edge characterized by complex curves, narrow channels, thin projections and sharp angles. The cutting edge of such a tool usually consists of a very hard material, such as chilled steel or tungsten carbide, swaged or otherwise secured upon a metal base of lower cost. The making of a circular form-tool is a task demanding the highest skill of the toolmaker's art where allowable tolerances do not exceed a few thousandths of an inch. In the making of a circular form-tool elaborate machinery is required, much skill in the operation thereof, and such tools are exceedingly expensive to manufacture. Every curve, channel, projection and angle must be painstakingly machined out by hand, using a material as hard as, or harder than, the material of the tool itself, preferably a diamond grinding wheel.

When a circular form-tool of specific contour has been made in this manner, it is then used by moving it against a rotating bar or rod of the metal or other material to be shaped, and as the projecting ridges of the form-tool cut away the material of the bar being worked upon, the latter ultimately assumes a circular contour corresponding to that of the form-tool and constituting a positive reproduction of the contour exhibited in negative form by the form-tool itself.

For such purposes the bar or rod being worked upon is held in a lathe by suitable chucks, and when the cutting operation is complete the form-tool is backed away from the work and the work is removed from the chucks.

While a circular form-tool is tipped with a material such as chilled steel or tungsten carbide which is far harder than the metal to be worked upon, the form-tool has a definite life depending upon the allowable tolerances. The high points of the projections of the form-tool necessarily receive more wear than the bottoms of channels or other depressions in the cutting edge. Sharp corners and carefully established angular intersections tend to become dulled or the angles altered. Every form-tool has a definite life, depending upon the materials and the manner of use. When a form-tool has become so far worn that it is no longer capable of producing a circular contour meeting the tolerance requirements set up, the form-tool must then be sent back to the toolmaker for resharpening.

Resharpening a form-tool when necessary to restore the exact outline of the cutting edge is tedious and expensive work. It requires the same care and skill that were required in the original manufacture thereof, and each facet of the complex edge must be separately ground down by a highly skilled toolmaker till the desired exact contour is re-established.

So far as we are aware, before the present invention, no means have been available of grinding or resharpening a form-tool, or duplicating form-tools from the first handmade specimens, in a single operation. Necessarily the grinding tool by which a form-tool is cut must be harder than the form-tool, and where the form-tool is made of high-speed chilled steel or tungsten carbide, the choice of a grinding wheel to cut the same is substantially restricted to a diamond-charged abrasive surface, because high-speed chilled steel and tungsten carbide are only exceeded in hardness by the diamond.

Prior to the present invention it has not been possible to produce a diamond-charged surface having the complex curves, narrow channels, thin projections and sharp angles which are required to mate with the corresponding shape of a circular form-tool of complex contour for various reasons as follows: Flowing a suspension of diamond particles in oil upon a rotating wheel is unsatisfactory because the oil tends to get into the bearings by capillary attraction, and to eat them away, destroying accurate adjustments. Rolling loose diamond dust into the face of a cast iron wheel involves excessive loss of diamond dust and damage to the cutting edges of the diamond particles themselves. Neither of these methods is therefore suited to the simultaneous grinding of all the facets of the edge of a form-tool. The only prior effort, so far as we are aware, to embody diamond particles in a hardened supporting matrix upon the surface of a rotating tool has been that described in the Sanford Patent No. 1,981,070 granted November 27, 1934, which discloses the molding of a mixture of diamond particles and phenol-formaldehyde resin in powder form upon the surface of a grinding tool under high pressure and temperature. Such method of producing a diamond-charged grinding wheel does not solve the problem here discussed, because where the shapes are complex and channels or re-entrant angles are deep molds cannot be made which will reproduce them. Hence a diamond-containing pressure-hardened matrix made in a mold is limited in its practical application to simple shapes; even in such shapes the resulting phenol-formaldehyde matrix is exceedingly "tender" when used upon substances as hard as chilled steel or tungsten carbide, resulting in short life of the wheel.

According to the present invention, a diamond-containing matrix of extreme thinness may be bonded upon the periphery of a wheel of any desired metal, and may be applied in a liquid state by brushing or spreading and allowing it to harden at atmospheric pressure without the use of molds or superatmospheric pressure. According to the invention, diamond particles of desired mesh size are suspended in a liquid varnish of a character which will harden at atmospheric pressure by escape of volatile constituents leaving, as a residue, a dense mass giving proper support to the diamond particles, and such liquid may be brushed or spread upon a wheel of any desired contour, and more particularly of complex contour corresponding to and mating with the complex contour of a circular form-tool. As a result, when a circular form-tool tipped with tungsten carbide has once been made, a complementary mating wheel may immediately be made from the original form-tool, and the surfaces of this mating wheel may then be provided with a diamond-containing matrix of extreme thinness which will not destroy the accuracy of the angles and contours. Thereafter, this mating wheel may be used either to resharpen (i. e., reproduce or restore) the worn original form-tool to its original contour in a single operation, or to reproduce (i. e., manufacture new) in a single operation as many additional form-tools of the same specific contour as may be required. In consequence, the cost of maintenance and of reproduction of form-tools of a given specific contour is greatly reduced.

Referring to the annexed drawing which forms a part of this specification:

Figure 1 shows in plan view a circular form-tool at the moment of its withdrawal upon the completion of a cutting operation upon a rod held in the chucks of a lathe.

Figure 2 shows the same, or a similar, form-tool about to be brought into engagement with a resharpening wheel whose contour is complementary to and mates with that of the form-tool.

Figure 3 illustrates diagrammatically one mode of applying the form-tool to the blank wheel which is to become its complementary or mating wheel.

Figure 4 shows one manner in which the diamond-supporting matrix may be applied to the complementary wheel.

Figure 5 illustrates diagrammatically another mode of applying the form-tool to the blank wheel which is to become its complementary or mating wheel.

Figure 6 shows another manner in which the diamond-supporting matrix may be applied to the complementary wheel.

Similar reference characters refer to similar parts of the several figures in the drawing.

In the production of complex circular shapes formed from metal bars or rods, it is the present practise to secure a rod or bar 10 of the desired metal between the chucks of a lathe where it is rotated about its longitudinal axis at turning speed. In Figure 1 rod 10 is supported between stationary chuck 11 and a rotary chuck (not shown) by which rod 10 is rotated. The circular form-tool 12, supported in any suitable manner, is tipped along its cutting edge with material 13 of great hardness, such as high-speed chilled steel or tungsten carbide. This tip is swaged or otherwise secured to the body of the tool 12 which is generally made of a metal of less cost. The form-tool shown, for purposes of illustration in Figures 1 and 2, has a specific outline or contour along its cutting edge which will be assumed to be required by the work to be done. When the rod 10 is rotating at proper speed the form-tool 12 is moved gradually towards it until it begins to cut at the highest points of the contour, corresponding to the points on the work where the deepest cut is to be made. As cutting proceeds the form-tool is advanced until it reaches that point at which cutting is complete, and the rod has been given a positive circular contour corresponding to the negative contour of the form-tool as shown in Figure 1. The form-tool is then backed off until it entirely disengages the work, whereupon the formed rod is removed and a new rod is inserted in the chucks and the operation is repeated.

In carrying out the present invention in one of its aspects, a wheel 14 which may be of relatively large diameter and of relatively soft metal, whose surface is initially cylindrical as indicated by the dotted lines 15 in Figure 2, is mounted upon an arbor 16 and rotated at any suitable turning speed. While the form-tool 12 is new, and its cutting edges have not yet become dulled or worn to any substantial degree by use, the form-tool 12 is mounted in a suitable holder and is brought into contact with the surface of the wheel 15, thereby cutting away the material of said wheel until the said wheel has assumed a circular contour which is a positive reproduction corresponding to and mating with the negative contour of the form-tool. Thereupon the form-tool is backed away from the wheel 14 and may be put in use in the regular manner as illustrated in Figure 1.

The wheel 14 now becomes the complementary or mating wheel upon whose surface is preserved a permanent and useful record of the shape and configuration of the form-tool when new. When the surface of this mating wheel 15 is treated in the manner hereinafter set forth, it becomes the means or instrumentality by which the form-tool may be resharpened to its original contour after it has become worn, and by which additional form-tools may be made identical in contour to the original.

The mating wheel 14 may be made of any metal which is easily cut by the form-tool. Preferably we make the mating wheel 14 of aluminum because this metal is light and with this metal it is relatively easy, by proper adjustment of the angle between the form-tool 12 and the tangent to the surface of the wheel 14 at the point of application, to leave behind on the surface of the wheel 14 a certain roughness in the metal, which, when seen under the microscope, comprises a series of tongues or burrs projecting upwardly from the metal surface and known as "cat's teeth." Other metals, such as steel, may be treated in the same manner and with the same effect by proper adjustment of the angle of application.

Preferably the mating wheel 14 should be of substantially larger diameter than the bar 10 or other work which the form-tool is adapted to cut. For purposes of illustration, it may be assumed that the bar 10 has a diameter of two inches and the mating wheel 14 has a diameter of sixteen inches. The purpose of having the wheel 14 so large is to facilitate its subsequent function as a diamond-bearing grinding wheel or tool.

After the mating wheel 14 has been formed, so that its contour is complementary to that of the form-tool 12, a very thin layer of liquid material is then applied upon those surfaces of wheel 14 which it is desired to convert into abrasive surfaces.

This material comprises a suspension of fine diamond particles in a varnish or lacquer capable of hardening under atmospheric pressure. A satisfactory mixture contains seventy-five parts by weight of liquid varnish and twenty parts by weight of diamond particles. The varnishes or lacquers which we have found particularly useful are glyptol resins, formaldehyde-urea, and esters of acryllic acid. Glyptol resins are advantageous because their air-drying properties permit the hardening of the varnisht on the surface of the wheel without the application of heat. Formaldehyde-urea is advantageous because this material is found to surround the diamond particles readily, adheres with great strength, and resolves itself into a dense, compact body which is noticeable for the absence of checking or cracking. Other types of varnishes or lacquers may be used which are capable of hardening at atmospheric pressure and which possess the properties of the varnishes or lacquers mentioned. These varnishes harden by loss of volatile constituents at atmospheric pressure, either at room temperature or upon the application of heat, leaving a hardened residue.

The diamond-containing liquid varnish may be applied directly to the surface of the mating wheel 14 by brushing or otherwise, and may then be hardened in place by exposure to the air or by the application of heat as required. We prefer to apply this material by brushing as the distribution thereof can be more accurately controlled and it can be applied exclusively to those surfaces where an abrasive is required. The varnishes mentioned are susceptible of being applied by brushing in an extremely thin layer or coating and in such manner as not to destroy the accuracy of the reproduction within allowable tolerances. In some cases, and with some metals, or where particularly high speeds are contemplated, it may be desirable or necessary to provide a bond between the hardened diamond-containing matrix and the surface of the metal of the wheel 14. In that event, we have discovered that a suitable bonding may be brought about in either of the two following ways:

The form-tool 12 may be applied to the surface of the wheel 14 in such a way, and at such an angle to the tangent at the point of application, as to produce a smooth, even surface in the metal. This is suggested diagrammatically in Figure 3. In this event, if the smoothness of the metal makes it necessary, an undercoating 17 of some adhesive material which forms a firm bond with the metal and which hardens on exposure to the air, may first be applied to the metal. A suitable adhesive for this purpose is thinned varnish or waterproof varnish. Thereafter, while the undercoat is still tacky, the abrasive-containing varnish may then be applied to the undercoating in the manner already stated.

Alternatively, in accordance with this invention, the surface of the mating wheel 14 may be roughened to provide projecting tongues or burrs which form a bonding or securing means for the matrix. One way of forming such roughened surface is to apply the tip 13 of the form-tool 12 to the surface of wheel 14 at such an angle as to have a reverse or negative rake, as suggested diagrammatically in Figure 5. In cutting any metal or other substance with a particular tool, there is an optimum angle of the tool for producing the smoothest surface. Where reference is herein made to a "reverse or negative rake," no particular angle is meant, but it is intended that an angle shall be used which is substantially different from that angle which produces a smooth surface and which produces a substantially roughened or burred surface. In that event the form-tool will cut the metal of the wheel 14 in such manner as to leave a rough uneven surface which, when seen under the microscope, appears to have upwardly projecting tongues or burrs of metal which are known as "cat's teeth." These are suggested diagrammatically at 18 in Figure 5.

In the event that the surface of the wheel 14 is roughened by the formation of "cat's teeth" in any manner or in the manner above set forth, we have found that, when the abrasive-containing varnish is applied directly thereto, an exceedingly firm and satisfactory bond is formed which permits use of the wheel with exceedingly high peripheral velocity.

When the mating wheel has been completed in the manner described it may then be stored for future use in resharpening or reshaping the form-tool to which it corresponds and by which it was initially cut, or it may be used in making additional form-tools identical with the original. In such use, the mating wheel is revolved at grinding speed and the form-tool which it is desired to grind is moved against it in the usual manner. Thus the form-tool is shaped or reshaped exactly in accordance with the desired contour in all respects in a single operation.

While we believe that we are the first to produce a resharpening tool capable of resharpening or reproducing a circular form-tool of complex contour, and of the method of making it, we believe and intend that our invention is not limited in scope to this single instance of its application but that it includes all the methods and structures which are set forth in the subjoined claims.

Where reference is made in the subjoined claims to a method of "reproducing" the cutting edge of a form-tool, it is intended to include not only the making of a new form-tool corresponding in contour to an original tool used as a model, but also to the resharpening or repair of existing tools previously made, including if required the original tool used as a model.

We claim:

1. The method of reproducing the cutting edge of a circular form-tool which comprises cutting a blank mating wheel to a circular contour corresponding to and reproducing in positive the negative contour of the cutting edge of a form-tool by moving said form-tool against said blank while the latter is rotating at turning speed, applying to the contour surface thus generated upon the mating wheel a thin coating of a liquid suspension of diamond particles in a varnish capable of hardening at atmospheric pressure, causing the varnish in said coating to harden, and cutting an additional form-tool from suitable hard material by moving said material against the coated surfaces of the mating wheel while the latter is rotating at grinding speed.

2. The method of reproducing the cutting edge of a circular form-tool which comprises cutting a blank mating wheel to a circular contour corresponding to and reproducing in positive the negative contour of the cutting edge of a form-tool by moving said form-tool against said blank while the latter is rotating at turning speed, applying to the contour surface thus generated upon the mating wheel a thin layer of liquid adhesive capable of bonding with the material of which said surface consists, applying upon the adhesive layer a thin coating of a liquid suspension of diamond particles in a varnish capable of hardening at atmospheric pressure, causing the varnish in said coating to harden, and cutting an additional form-tool from suitable hard material by moving said material against the coated surfaces of the mating wheel while the latter is rotating at grinding speed.

3. The method of reproducing the cutting edge of a circular form-tool which comprises cutting a blank mating wheel to a circular contour corresponding to and reproducing in positive the negative contour of the cutting edge of a form-tool by moving said form-tool against said blank while the latter is rotating at turning speed at such angle with respect to the tangent at the point of application and the direction of rotation as to produce a roughened surface upon said blank characterized by having projecting tongue-like portions of the material of which said surface consists, applying to the roughened surface thus produced upon the mating wheel a thin coating of a liquid suspension of diamond particles in a varnish capable of hardening at atmospheric pressure, causing the varnish in said coating to harden, and cutting an additional form-tool from suitable hard material by moving said material against the coated surfaces of the mating wheel while the latter is rotating at grinding speed.

4. The method of reproducing within allowable limits of tolerance the negative contour of the hard cutting edge of a form-tool having a high degree of accuracy, which includes the steps of applying the cutting edge to be reproduced to the surface of a blank rotated at turning speed whereby to produce upon said blank a surface of revolution which in cross-section is the positive complement of the cutting edge to be reproduced, the said cutting edge being applied at least during the final revolution of the blank with a reverse rake with respect to the surface of the blank being cut whereby to produce upon said blank a roughened surface, coating at least a part of said roughened surface with a thin layer of diamond powder and a bonding material, and curing the thus coated blank to form a hardened diamond-containing matrix upon the parts of said surface where the coating was applied capable, when the blank is used as a high-speed grinding wheel, of reproducing, in hard form-tool edging material, the negative contour of the original form-tool.

5. The method of reproducing within allowable limits of tolerance the negative contour of the hard cutting edge of a form-tool having a high degree of accuracy, which includes the steps of applying the cutting edge to be reproduced to the surface of a blank rotated at turning speed whereby to produce upon said blank a surface of revolution which in cross-section is the positive complement of the cutting edge to be reproduced, coating at least the high points of the surface of the blank with a thin layer of a liquid suspension of diamond particles in a bonding material capable of hardening at atmospheric pressure, curing the thus coated blank to form a hardened diamond-containing matrix adhering to said blank in the areas where said coating was applied, and applying hard form-tool material to be shaped to the thus prepared surface of the blank while the same is rotated at grinding speed whereby to cut in said material a negative contour substantially the same as the contour of the original tool.

6. The method of reproducing within allowable limits of tolerance the negative contour of the hard cutting edge of a form-tool having a high degree of accuracy, which includes the steps of applying the cutting edge to be reproduced to the surface of a blank rotated at turning speed whereby to produce upon said blank a surface of revolution which in cross-section is the positive complement of the cutting edge to be reproduced, the said cutting edge being applied at least during the final revolution of the blank with a reverse rake with respect to the surface of the blank being cut whereby to produce upon said blank a roughened surface, coating at least the high points of the thus formed surface of the blank with a thin layer of a liquid bonding material containing diamond particles suspended therein, and curing the thus coated blank to form a hardened diamond-containing matrix adhering to the roughened surface of the blank in the areas where said liquid layer was applied, said matrix being capable, when the blank is used as a high-speed grinding wheel, of reproducing, in hard form-tool edging material, the negative contour of the original form-tool.

FOLLIARD F. GILMORE.
FRANK W. KOTLER.